United States Patent
Fadelu et al.

(10) Patent No.: US 12,197,959 B2
(45) Date of Patent: Jan. 14, 2025

(54) PREEMPTION IN A MACHINE LEARNING HARDWARE ACCELERATOR

(71) Applicant: Google LLC, Mountain View, CA (US)

(72) Inventors: Temitayo Fadelu, San Francisco, CA (US); Ravi Narayanaswami, San Jose, CA (US); JiHong Min, San Francisco, CA (US); Dongdong Li, Mountain View, CA (US); Suyog Gupta, Sunnyvale, CA (US); Jason Jong Kyu Park, San Jose, CA (US)

(73) Assignee: Google LLC, Mountain View, CA (US)

( * ) Notice: Subject to any disclaimer, the term of this patent is extended or adjusted under 35 U.S.C. 154(b) by 15 days.

(21) Appl. No.: 18/036,506

(22) PCT Filed: Dec. 21, 2020

(86) PCT No.: PCT/US2020/066430
§ 371 (c)(1),
(2) Date: May 11, 2023

(87) PCT Pub. No.: WO2022/139795
PCT Pub. Date: Jun. 30, 2022

(65) Prior Publication Data
US 2023/0418677 A1    Dec. 28, 2023

(51) Int. Cl.
*G06F 9/48* (2006.01)
*G06F 9/50* (2006.01)

(52) U.S. Cl.
CPC .......... *G06F 9/5055* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 10,579,417 B2* | 3/2020 | Bak | G06F 9/4831 |
| 11,080,111 B1* | 8/2021 | Perelygin | G06F 9/544 |
| 2010/0050184 A1* | 2/2010 | Lin | G06F 9/4812 712/E9.034 |
| 2010/0110083 A1 | 5/2010 | Paltashev et al. | |
| 2013/0124838 A1 | 5/2013 | Shah et al. | |
| 2014/0149990 A1 | 5/2014 | El-Moursy et al. | |
| 2014/0198799 A1* | 7/2014 | Dalal | G06F 9/4843 370/394 |
| 2016/0140686 A1 | 5/2016 | Lueh et al. | |
| 2018/0293692 A1 | 10/2018 | Koker et al. | |

(Continued)

OTHER PUBLICATIONS

International Preliminary Report on Patentability in International Appln. No. PCT/US2020/066430, mailed on Jun. 29, 2023, 11 pages.

(Continued)

*Primary Examiner* — Michael Sun
(74) *Attorney, Agent, or Firm* — Fish & Richardson P.C.

(57) ABSTRACT

The present disclosure describes a system and method for preempting a long-running process with a higher priority process in a machine learning system, such as a hardware accelerator. The machine learning hardware accelerator can be a multi-chip system including semiconductor chips that can be application-specific integrated circuits (ASIC) designed to perform machine learning operations. An ASIC is an integrated circuit (IC) that is customized for a particular use.

20 Claims, 5 Drawing Sheets

(56) References Cited

U.S. PATENT DOCUMENTS

2020/0082273 A1    3/2020    Rossi et al.
2020/0272444 A1    8/2020    Nilsen
2021/0224072 A1*  7/2021    Goodman ............. G06F 9/3887

OTHER PUBLICATIONS

International Search Report and Written Opinion in International Appln. No. PCT/US2020/066430, mailed on Sep. 2, 2021, 18 pages.
Snyder et al., "Fast context switches: compiler and architectural support for preemptive scheduling," Microprocessors and Microsystems, Feb. 1, 1995, 8 pages.

* cited by examiner

PREEMPTION IN A MACHINE LEARNING HARDWARE ACCELERATOR

CROSS-REFERENCE TO RELATED APPLICATION

This application is a National Stage Application under 35 U.S.C. § 371 and claims the benefit of International Application No. PCT/US2020/066430, filed Dec. 21, 2020. The disclosure of the foregoing application is hereby incorporated by reference in its entirety.

TECHNICAL FIELD

This disclosure generally relates to performing preemption and context switching in a machine learning hardware accelerator.

BACKGROUND

In computing, preemption is the act of temporarily interrupting a task being carried out by a computer system, without requiring its cooperation, and with the intention of resuming the task at a later time. Such changes of the executed task are known as context switches. They can be carried out by a privileged task or part of the system known as a preemptive scheduler, which has the power to preempt, or interrupt, and later resume, other tasks in the system.

SUMMARY

In general, the disclosure involves a system and method for preempting a long-running process with a higher priority process in a machine learning system, such as a hardware accelerator. At run-time for a first process which is a long-running process, the machine learning accelerator can execute the first process in a first context. The machine learning accelerator can identify that a second process, with a higher priority than the long-running process is queued, and upon reaching a preemption checkpoint in the first process the machine learning accelerator can determine an amount of available resources, and if the amount of available resources is less than a required amount for the second process the machine learning accelerator can: save in-process values of the first process, switch contexts to a second context, execute the second process and upon completion, switch back to the first context, restore the in-process values of the first process, and resume execution of the first process. Implementations can optionally include one or more of the following features.

In some implementations, the in-process values include instructions, activation data, parameters, hardware states, compute operands, and results.

In some implementations, in response to the amount of available resources being greater than the required amount for the higher priority process, the machine learning accelerator can: pause execution of the first process, allocate available resources to the second process, switch to a second context, execute the second process, and upon completion of the second process, switch to the first context and resume execution of the first process.

In some implementations, at compile-time for the first process, a maximum allowable latency for the second process is determined, data synchronization checkpoints are identified to be used as preemption points and a maximum expected time delay between data synchronization points is determined. In response to the maximum expected time delay being above a predetermined threshold, preemption checkpoints are inserted into the code of the first process.

In some implementations, allocating available resources to the higher priority process includes assigning a start and stop address for each memory in a plurality of memories of a plurality of compute units.

In some implementations performing a save for the first process includes the machine learning accelerator copying each memory of a plurality of memories of a plurality of compute units to a shared memory and clearing each memory of the plurality of memories of the plurality of compute units. In these implementations, restoring the first process includes writing the copied memories from the shared memory to each memory of the plurality of memories of the plurality of compute units.

In some implementations preemption checkpoints and synchronization checkpoints are memory fences.

The various implementations provide one or more of the following advantages. For example, in some implementations, the machine learning hardware accelerator need no not execute tasks serially, and thus a long-running but low priority task can be interrupted to allow higher priority tasks with low latency requirements to execute.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure describes a system and method for preempting a long-running process with a higher priority process in a machine learning system, such as a hardware accelerator. For example, the machine learning hardware accelerator can be a multi-chip system including semiconductor chips that can be application-specific integrated circuits (ASIC) designed to perform machine learning operations. An ASIC is an integrated circuit (IC) that is customized for a particular use. For example, an ASIC may be designed to perform operations of machine learning models including, e.g., recognizing objects in images as part of deep neural networks, machine translation, speech recognition, or other machine learning algorithms. When used as an accelerator for a neural network, for instance, an ASIC can receive inputs to the neural network and compute a neural network inference for the inputs. Data inputs to a neural network layer, e.g., either the input to the neural network or the outputs of another layer of the neural network, can be referred to as activation inputs. The inferences can be computed in accordance with respective sets of weight inputs associated with the layers of the neural network. For example, some or all of the layers may receive a set of activation inputs and process the activation inputs in accordance with the set of weight inputs for the layer to generate outputs. Moreover, neural network operations can be performed by a system of ASICs according to explicit operations schedules.

The machine learning hardware accelerator can include a scalar core, which coordinates the operations of one or more groups of ASICs which behave as compute units. The scalar core can control multiple contexts, each context including one or more inference processes that are to be executed on the system of ASICs. The scalar core coordinates context switching, and memory allocation for each context.

The machine learning hardware accelerator can additionally include a job scheduler, which coordinates messages and data transfer between the ASICs, the scalar core, and one or more shared memories, as well as to and from external sources such as a datacenter network that is originating processes to be executed on the machine learning hardware accelerator.

Figure 1:
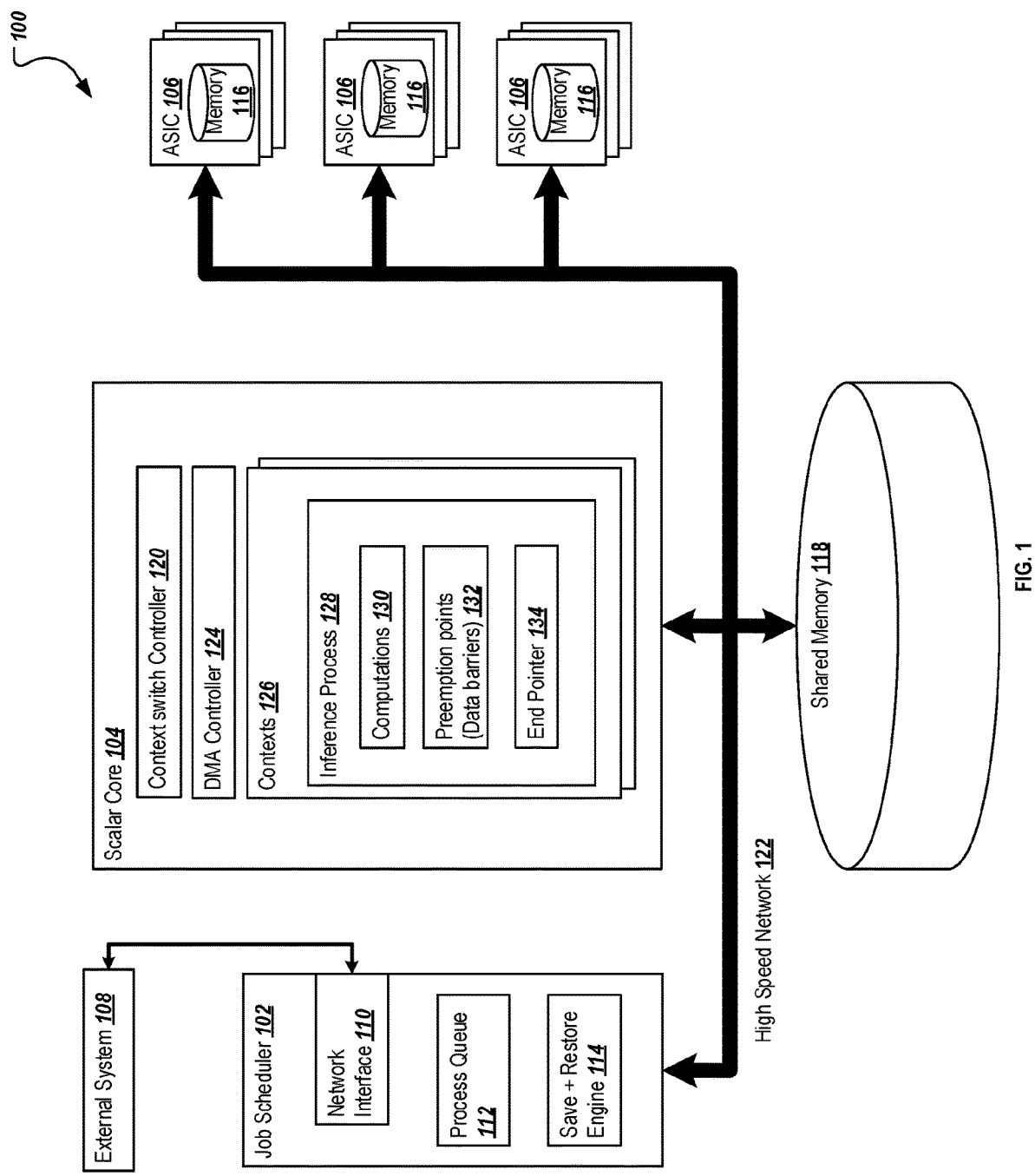
FIG. 1 depicts an example system architecture for a machine learning hardware accelerator that performs preemption of running processes.

FIG. 1 illustrates an example system architecture of an implementation of a machine learning hardware accelerator 100. The machine learning hardware accelerator 100 includes job scheduler 102, a scalar core 104, and a group of ASICs 106 or a computation engine. The ASICs 106 are the primary compute units of the accelerator 100 and perform the majority of the operations to execute one or more inference processes. The ASICs 106 are described in greater detail with reference to FIG. 4. The different components of the accelerator 100 communicate via high speed network 122, which can be a custom network configured to minimize communication latency within the accelerator 100. The high speed network 122 can be, for example, a peripheral component interconnect express (PCI Express) network, fiber optic network, or other communications network.

Job scheduler 102 receives new jobs to be processed from an external system 108 via network interface 110. The external system 108 can be an external datacenter, user device, or other system that is accessing the machine learning hardware accelerator 100.

The network interface 110 is used by the job scheduler 102 for communicating with other systems in a distributed environment. Generally, the interface 110 comprises logic encoded in software and/or hardware in a suitable combination and operable to communicate with the external system 108 and other components. More specifically, the interface 110 can comprise software supporting one or more communication protocols associated with communications such that the job scheduler 102 is operable to communicate physical signals within and outside of the illustrated system 100.

Job scheduler 102 includes a process queue 112, which maintains a queue of inference processes that are to be run on the accelerator 100. The process queue 112 can include a priority level for each inference process. This priority level can be assigned by the external system 108, or by the job scheduler 102 itself based on implicit requirements in the process (e.g., a return latency of less than 10 ms, etc.).

The job scheduler 102 also includes a save and restore engine 114. The save and restore engine 114 is capable of reading the memories 116 of the ASICs 106 and transferring data from each individual memory 116 to a shared memory 118. The individual memories 116 associated with each ASIC 106 can be, for example, static random-access memory (SRAM) and can contain the required data for performing the current inference the ASICs 106 are executing. Shared memory 118 can be a memory accessed by the ASICs 106, scalar core 104 and the job scheduler 102, via the high speed network 122. Shared memory 122 can include any memory or database module and can take the form of volatile or non-volatile memory including, without limitation, magnetic media, optical media, random access memory (RAM), read-only memory (ROM), removable media, or any other suitable local or remote memory component. Shared memory 122 can store various objects or data, including user and/or account information, administrative settings, password information, caches, applications, backup data, repositories storing dynamic information, and any other appropriate information associated with the accelerator 100, including any parameters, variables, algorithms, instructions, rules, constraints, or references thereto. The save and restore engine 114 can record a current state of the ASICs 106, and save that state in the shared memory 122, allowing the associated memories of each ASIC 116 to be cleared, freeing resources for a different inference or job. The save and restore engine 114 can additionally restore a saved state of the ASICs 106 from shared memory 122, permitting the ASICs 106 to continue execution, or re-execute a saved inference process.

The scalar core 104 directs and instructs the ASICs 106 in computations. It maintains one or more contexts 126 which define the information required to perform an inferences process 128. Each context 126 can include, but is not limited to, instructions, activation data, parameters, hardware states, compute operands, and results, among other things. This data can be stored in the ASIC memories 116. In order to permit preemption of an inferences process 128, the scalar core 126 can switch active contexts 126 and load the new inferences process to the ASICs 106.

A context switch controller 120 can manage which context 126 is active. For example, upon receiving a signal from the job scheduler 102, the context switch controller 120 can initiate a context switch. The scalar core 104 will continue executing the current context 126 and active inference process 128 will continue performing computations 130 until a preemption point 132 is reached. The preemption checkpoint 132 is a memory barrier, or scalar fence, that was inserted into the inference process 128 at compile time. In some implementations, where parallel processing is desirable, synchronization checkpoints can be used to ensure data across parallel processes is synchronized. These synchronization checkpoints can be scalar fences. Scalar fence or memory barrier, merely represents enforced ordering of operations. In other words, computations 130 that are issued prior to the scalar fence (e.g., preemption checkpoint 132) are guaranteed to be executed prior to computations 130 that may be issued after the scalar fence. In addition to data synchronization checkpoints, other preemption checkpoints 132 can be inserted (e.g., using a hint bit) into the inference process. In some implementations the preemption checkpoints 132 are inserted during compile time to ensure the inference process will reach a preemption checkpoint 132 at a predetermined frequency (e.g., every 10 ms or every 50 ms, etc.) to minimize a time delay between when the preemption is requested by the job scheduler 102 and when a preemption checkpoint 132 is reached.

Once the preemption checkpoint 132 is reached, and because the preemption checkpoint 132 is a fence instruction, the ASICs 106 are in a known, stable state, and the scalar core 104 and job scheduler 102 can determine whether or not a save and restore is required. For example, the scalar core can verify the available memory remaining in the ASICs 106. If enough unused memory remains, then the scalar core 104 can allocate that unused memory to the new inference process that will execute in the new context. Otherwise, if there is not enough available memory, the scalar core can use a direct memory access (DMA) controller 124 to request a save and restore from the job scheduler 102. Once the job scheduler 102 has performed a save using the save and restore engine 114, and more memory is available in the ASICs 106, the scalar core 104 can proceed with the context switch.

The scalar core 104 will send an interrupt to the job scheduler 102, which selects the next context to be activated based on the process queue 112. The job scheduler 102 sends the next active context ID to the scalar core, which broadcasts the updated context ID to the ASICs 106. The ASICs 106 can then begin computations 130 on the newly loaded inference process 128. When the new inference process 128 is complete, an end pointer instruction 134 will indicate to the scalar core 104 that the process is complete. The scalar core 104 can then perform another context switch, in some implementations, switching back to the previous context.

ASICs 106 form an array of parallel computing engines which execute the inferences process 128 to perform a machine learning process. In general the ASICs 106 receive instructions from the scalar core 104 and the job scheduler 102, and return results to the scalar core 104 and job scheduler 102. While many implementations of an ASIC are contemplated within the scope of this disclosure, FIG. 4 describes in detail an example ASIC to be used in the machine learning hardware accelerator 100.

Figure 2:
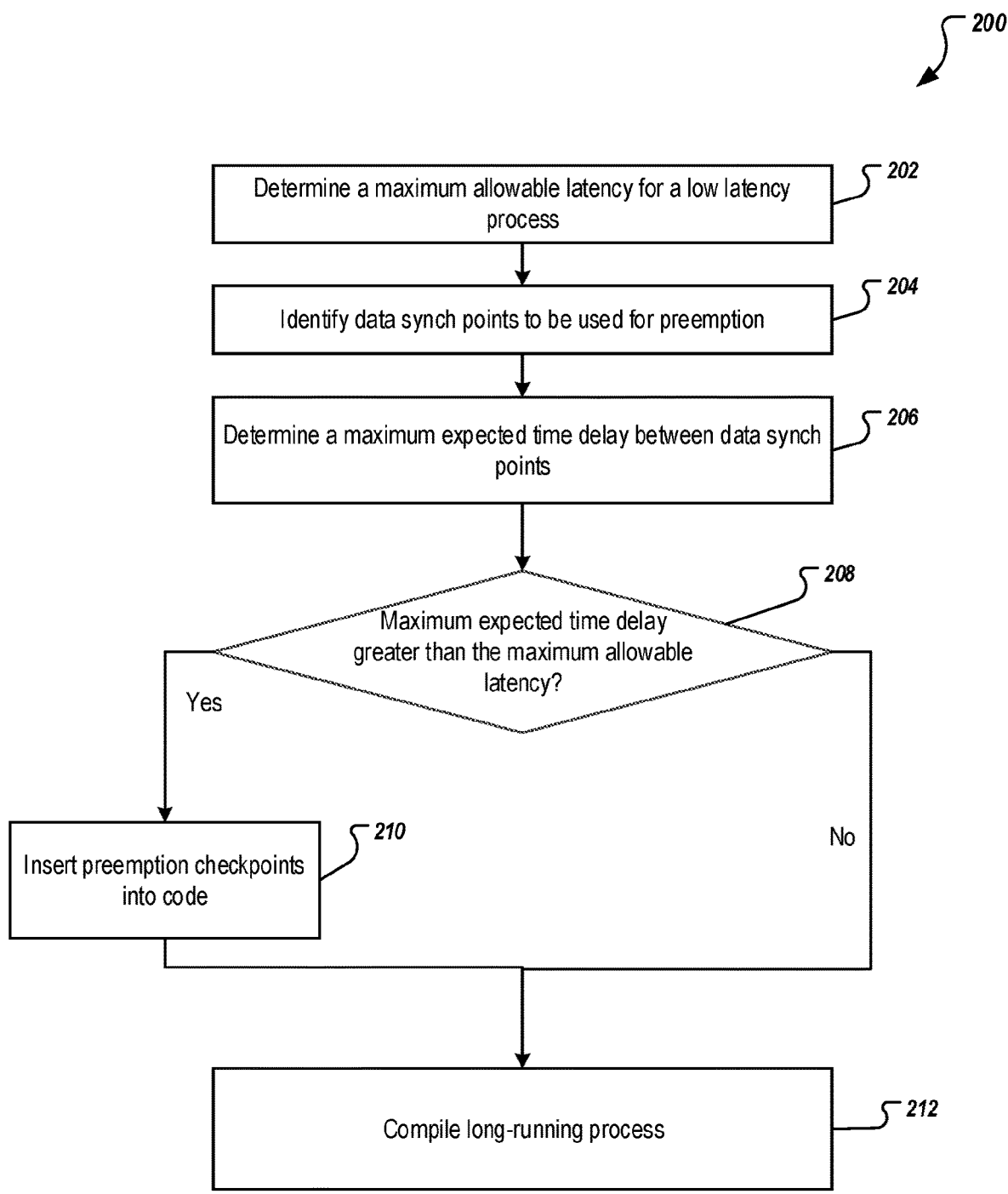
FIG. 2 is a flowchart illustrating an example process for inserting preemption checkpoints into a long-running process at compile time.

FIG. 2 is a flowchart illustrating an example process 200 for inserting preemption checkpoints into a long-running process at compile time. Process 200 can be performed by a compiler or a separate system. In some implementations, the compiler is part of the machine learning hardware accelerator.

At 202, a long-running process is being compiled and a maximum allowable latency for a low-latency process is determined. In some implementations this is a maximum amount of expected execution time before a preemption checkpoint in the code exists. For example, if a low-latency process, such as facial recognition in a video stream running on the hardware accelerator concurrently with a long-running process requires that the machine learning hardware accelerator provide a return for every frame, and the video is a 24 frame per second video, then the low-latency process must preempt the long-running process on the accelerator and complete execution at least once every 41.6 milliseconds (ms) (e.g., $$\frac{1 \text{ s}}{24 \text{ fps}}).$$

If the process itself takes a maximum of 16.6 ms to complete, then a maximum time between preemption points in the process to be preempted must be 41.6 ms−16.6 ms=25 ms. In this example, the low-latency process (facial recognition process) must be able to preempt the long-running process at least once every 25 ms to guarantee it will provide a return for every frame of the video.

In another example, during audio processing of voice for voice assistance, high priority processes can be processes that recognize user voice and convert to text or code that can be managed in real time. Long-running processes can start execution depending on commands contained within the processed voice recording (e.g., a "take photo" command, or a "perform an internet search" command). In this example, the long running processes associated with the commands could be context switched with high priority processes for recognizing user speech in order to enable the system to continue interaction with the user during execution of the command.

At 204, data synchronization points which exist in the long-running process are identified. Data synchronization points are often required for machine learning processes that execute in an environment of high parallelism. These data synchronization points include fence instructions, which ensure the tiles can be halted and resumed without causing error in the running process. The identified data synchronization points can be flagged as usable preemption checkpoints by the compiler.

At 206, an expected maximum time delay between the identified data synchronization checkpoints is determined. This can be determined for example, by line counting, or test executions, and can be determined for a time between each data synchronization checkpoint and its following data synchronization checkpoint. In some implementations, maximum expected time delay is determined by building an analytical model of the hardware accelerator to estimate computation time and load. In some implementations, linear regression, or additional machine learning processes can be used to predict execution time for a particular inference.

At 208, the expected maximum time delay determined at 206 is compared to the maximum allowable latency determined at 202. If it is determined that the maximum expected time delay is greater than the maximum allowable latency process 200 proceeds to 210 where additional preemption checkpoints are inserted into the code to reduce the maximum expected time delay. If the maximum expected time delay is less than the maximum allowable latency, process 200 proceeds to 212.

At 212, the code for the long-running process, including data synchronization checkpoints, and preemption checkpoints (if added), is compiled, and prepared for execution on the machine learning hardware accelerator.

Figure 3:
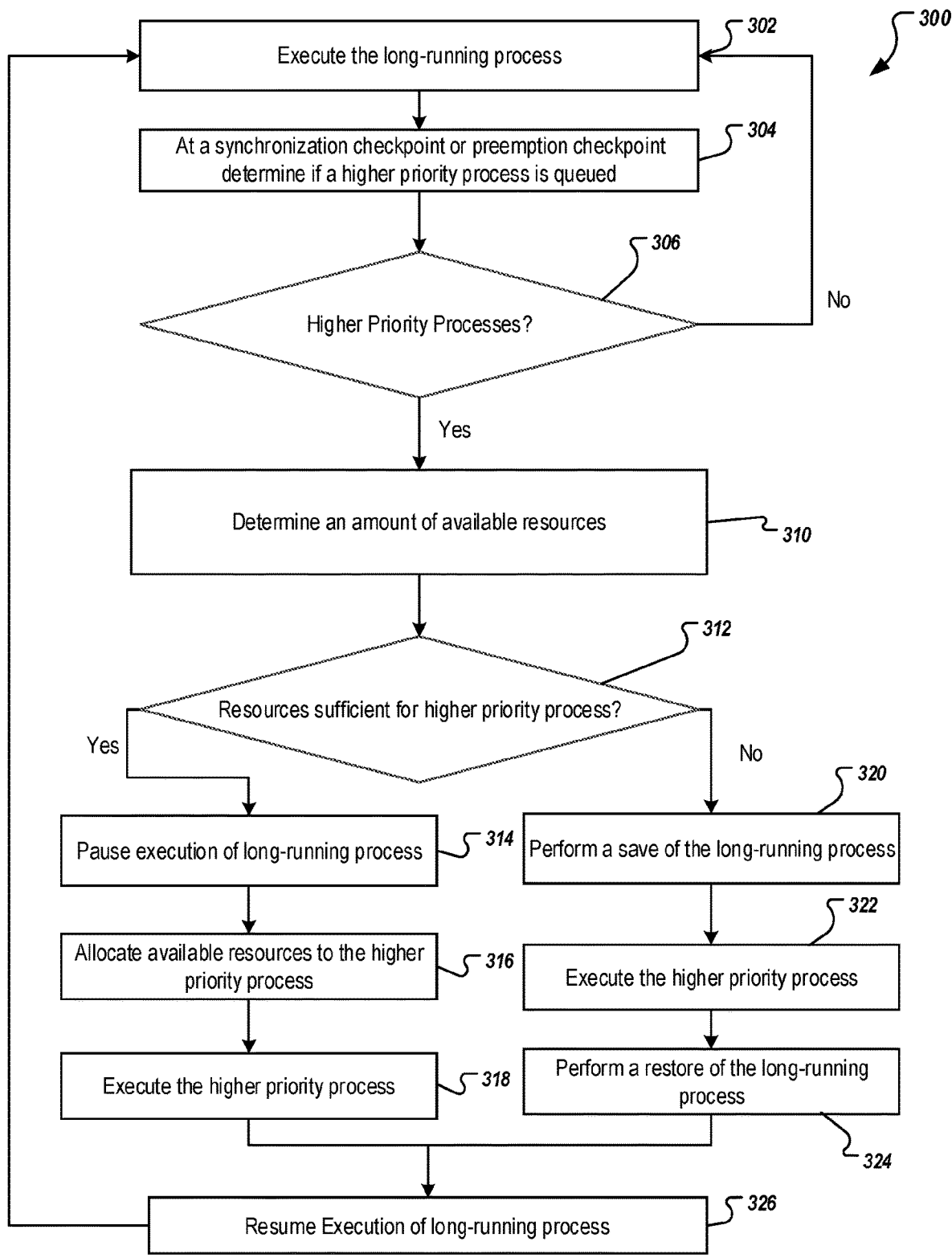
FIG. 3 is a flowchart illustrating an example process for conducting preemption of a long-running process during run-time.

FIG. 3 is a flowchart illustrating an example process 300 for conducting preemption of a long-running process during run-time. Process 300 can be executed by a machine learning hardware accelerator (e.g., machine learning hardware accelerator 100 as described with respect to FIG. 1) or a portion thereof.

At 302, a long-running process is executed in a first context. The long-running process can be managed by a scalar core which directs one or more ASICs (e.g., ASICs 106 as illustrated in FIG. 1) to perform the necessary operation and computations for the long-running process.

At 304, when a preemption checkpoint is reached in the long-running process, the scalar core confirms with the job scheduler of the machine learning hardware accelerator whether or not a higher priority process is queued. If a higher priority process is not queued, the scalar core continues to execute the long-running process and process 300 returns to 302. If a higher priority process is queued, process 300 proceeds to 310.

At 310, an amount of available resources in the ASICs is determined. Resources can include memory of various forms on board the individual ASICs, as well as compute power (e.g., number of ASICs required for the tasks).

At 312, it is determined whether the available resources are sufficient for the higher priority process to be executed without clearing or overwriting memory that is currently used by the long-running process. If it is determined there are sufficient resources, process 300 can proceed to 314 where the long-running process is preempted without performing a save in restore. If there are not sufficient resources for the higher priority process, process 300 continues to 320.

At 314, execution of the long-running process is paused. The pause occurs at a preemption checkpoint which is a fence instruction. In some implementations, the fence instruction ensures that all instructions prior to the fence instruction are carried out, and that the compute units of the hardware accelerator are stable. Once operations have ceased and the ASIC's memories are no longer being rewritten, available memory can be allocated (at 316) to the higher priority process. In some implementations, the scalar core assigns start and stop addresses to the higher priority process in an available portion of the ASIC memory to ensure the long-running process is not lost.

At 318, the higher priority process is executed. In some implementations it is executed to completion. Completion of the higher priority process can be indicated by returning an end-of-process pointer. From 318 the process proceeds to 326.

At 326, the execution of the long-running process is resumed. The long-running process continues until the process is either completed or preempted again. From 326 process 300 can return to 302, repeating until the long-running process is completed.

Returning to 312, when available resources are insufficient for the higher priority process, at 320 a save is performed on the long-running process. The save can include recording the state of the local memory, or a portion of the state, for each ASIC in the hardware accelerator to a shared memory. Once the save is complete, the ASIC memory can be cleared and resources made available for the higher priority process.

At 322, the scalar core completes a context switch, and executes the higher priority process on the ASICs using the newly available resources. Upon completion of the higher priority process, at 324, the scalar core can request a restore, and the state of the ASICs can be restored from shared memory to the individual memories of the ASICs in the hardware accelerator. The scalar core can then resume execution of the long-running process at 326.

Figure 4:
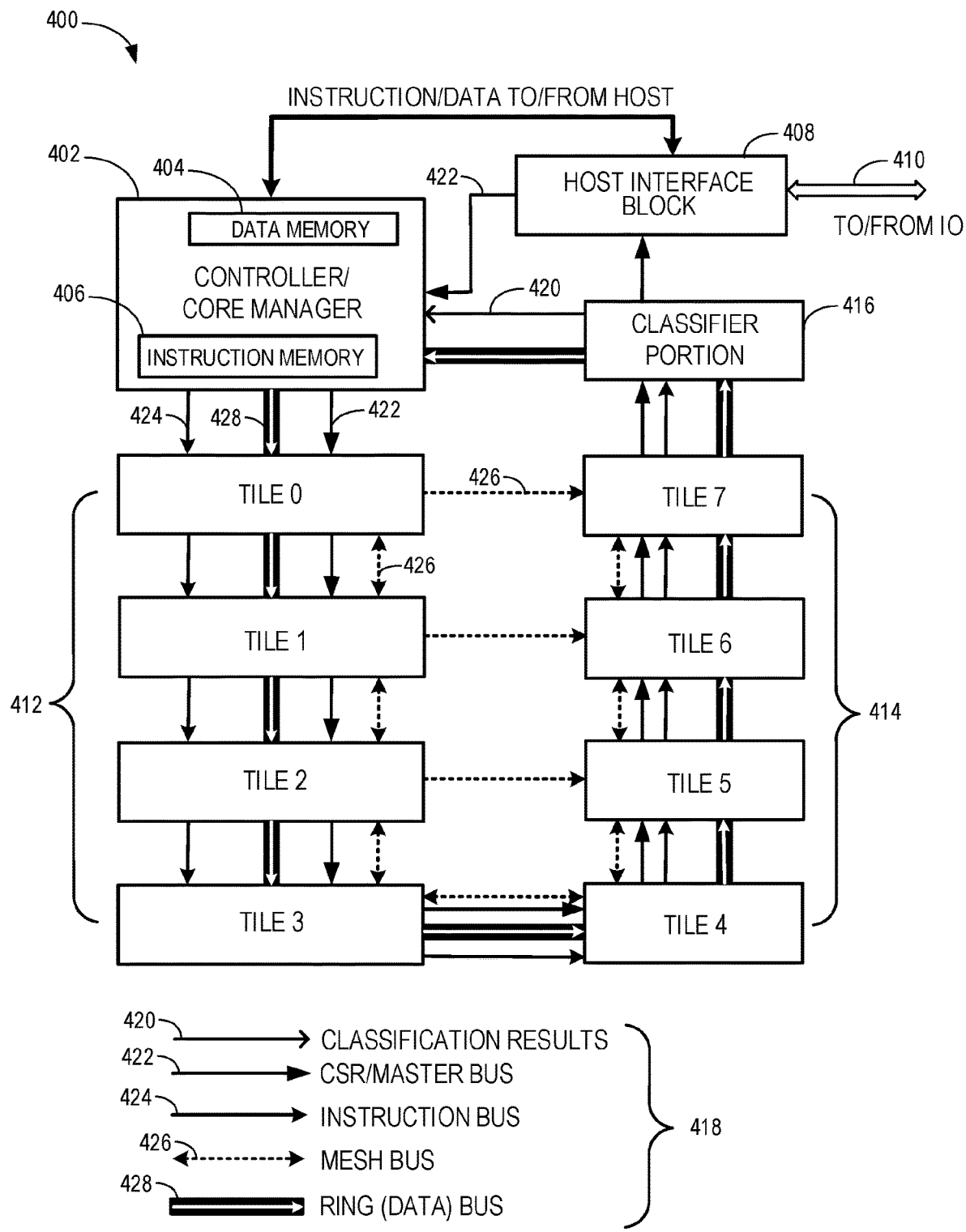
FIG. 4 shows a block diagram of an ASIC used in a machine learning hardware accelerator as an example computing system.

FIG. 4 shows a block diagram of an ASIC used in a machine learning hardware accelerator as an example computing system 400 for accelerating tensor computations associated with deep neural networks (DNNs). The system 400 can be, for example, the ASIC 106 as described with reference to FIG. 1. The system 400 generally includes a controller 402, a host interface 408, an input/output (I/O) link 410, multiple tiles including a first tile set 412 and a second tile set 414, a classifier portion 416, and data buses identified in a bus map 418 (which is shown for clarity, but is not included in the system 400). Controller 402 generally includes data memory 404, instruction memory 406, and at least one processor configured to execute one or more instructions encoded in a computer readable storage medium. Instruction memory 406 may store one or more machine readable instructions that are executable by the one or more processors of controller 402. Data memory 404 may be any of a variety of data storage mediums for storing and subsequently accessing a variety of data relating to computations that occur within system 400.

Controller 402 is configured to execute one or more instructions relating to tensor computations within system 400, including instructions stored in instruction memory 406. In some implementations, data memory 404 and instruction memory 406 are volatile memory unit or units. In some other implementations, data memory 404 and instruction memory 406 are non-volatile memory unit or units. Data memory 404 and instruction memory 406 may also be another form of computer-readable medium, such as a floppy disk device, a hard disk device, an optical disk device, or a tape device, a flash memory or other similar solid state memory device, or an array of devices, including devices in a storage area network or other configurations. In various implementations, controller 402 may also be referenced or referred to as core manager 402.

As depicted, host interface 408 is coupled to I/O link 410, controller 402, and classifier portion 416. Host interface 408 receives instructions and data parameters from I/O link 410 and provides instructions and parameters to controller 402. In general, instructions can be provided to one or more devices in system 400 through instruction bus 424 (described below) and parameters can be provided to one or more devices in system 400 through ring bus 428 (described below). In some implementations, instructions are received by controller 402 from host interface 418 at an initial time and stored in instruction memory 406 for execution by controller 402 at a later time.

Classifier portion 416 is likewise coupled to controller 402 and tile 7 of second tile set 414. In some implementations, classifier portion 416 is implemented as a separate tile within the system 400. In alternative implementations, classifier portion 416 is disposed or located within controller 402 as a sub-circuit or sub-device of controller 402. Classifier portion 416 is generally configured to perform one or more functions on accumulated pre-activation values that are received as outputs of fully connected layers. Fully connected layers may be partitioned across the tiles in tile sets 412 and 414. Thus, each tile is configured to produce a subset of pre-activation values (i.e., linear outputs) which may be stored in a memory unit(s) of the tile. Classification results bus 420 provides a data path from classifier portion 416 to controller 402. Data that includes post-function values (i.e., results) are provided to controller 402 from classifier portion 416 via classification results bus 420.

Bus map 418 shows data buses that provide one or more interconnected data communication paths between tiles of first tile set 412 and second tile set 414. Bus map 418 provides a legend for identifying a classification results bus 420, CSR/master bus 422, instruction bus 424, mesh bus 426, and ring bus 428 as depicted in FIG. 4. In general, a tile is a core component within the accelerator architecture of system 400 and is the focal point for tensor computations that occur in the system. Each tile is an individual computing unit that cooperates with other tiles in the system to accelerate computations across one or more layers of a multi-layer neural network. Although tiles in tile sets 412, 414 can share execution of tensor computations associated with a given instruction, an individual computing unit is a self-contained computational component configured to execute a subset of tensor computations independently relative to other corresponding tiles within tile sets 412, 414.

CSR bus 422 is a single master multiple slave bus that enables controller 402 to transmit one or more instructions that set program configurations and read status registers associated with one or more tiles. CSR bus 422 may be connected in a single daisy chain configuration with one master bus segment and multiple slave bus segments. As shown in FIG. 4, CSR bus 422 provides communications coupling through a bus data path that connects tiles in tile sets 412, 414 and controller 402 in a ring to host interface 410. In some implementations, host interface 410 is the single master of the CSR bus ring and the entire CSR bus address space is memory mapped to a memory space in host interface 410.

CSR bus 422 may be used by host interface 410 to perform one or more operations including, for example, programming memory buffer pointers in controller 402 to enable controller 402 to begin fetching instructions from instruction memory 406, updating/programming various tile settings (e.g., coefficient tables for polynomial approximation calculations) that remain static during one or more computations, and/or loading/reloading firmware to classification portion 416. In one example, firmware reloads may include new functions to be applied to linear outputs (i.e., pre-activation values). Accordingly, every slave having access to CSR bus 422 will have a distinct node identifier (node ID) that is tied to the slave and identifies it. The node ID will be part of an instruction address and will be used, inspected or otherwise examined by the CSR slaves (i.e., controller 402, tiles 412, 414 and classifier 416) to determine whether the CSR packet is addressed to the slave.

In some implementations, one or more instructions can be transmitted by host interface 402 through controller 402. The instructions may, for example, be 32-bits wide with the first 7-bits including header information indicating the instruction address/destination that is to receive and execute the instructions. The first 7-bits of the header may contain data parameters that represent a particular node ID. Slaves (e.g., each tile) on the CSR bus ring may therefore inspect the header of the instruction to determine if the request by the master (host interface 410) was addressed to the tile inspecting the header. If the node ID of the header does not indicate that the destination is the inspecting tile, the inspecting tile will copy the input CSR instruction packet to the CSR bus input connected to the next tile for inspection by the next tile.

Instruction bus 424 originates from controller 402 and, similar to CSR bus 422, also provides communications coupling through a bus data path that connects tiles in tile sets 412, 414 in a ring back to controller 402. In one implementation, controller 402 broadcasts one or more instructions via instruction bus 424. The instructions that are broadcast by controller 402 may differ from the instructions provided via CSR bus 422. However, the manner in which a tile receives and/or consumes or executes the instruction received via bus 424 may be similar to the process for executing instructions received via CSR bus 422.

In one example, a header (i.e., a bitmap) of the instruction indicates, to a receiving tile, that the receiving tile needs to consume a particular instruction based on a bitmap associated with the instruction. The bitmap may have a particular width defined in terms of bits. The instruction is typically forwarded from one tile onto the next tile based on parameters of the instruction. In one implementation, the width of instruction bus 424 may be configured to be smaller than the size/width of the instruction. Thus, in such a configuration, transmission of the instructions will be over several cycles and bus stops of instruction bus 424 will have decoders to place instructions received at the tile in the appropriate target instruction buffer associated with that tile.

As described further below, the tiles in tile sets 412, 414 are generally configured to support two broad categories of instructions. The two broad categories may also be referred to as instruction types. The instruction types include a tensor operation (TensorOp) instruction and a direct memory access (DMAOp) instruction. In some implementations, DMAOp instructions have one or more specializations that are allowed to be concurrent. The one or more specializations may be referred to as DMAOp instruction subtypes or opcodes. In some cases, every unique and/or valid DMAOp instruction type/subtype tuple will have a separate instruction buffer within a particular tile.

At a particular tile of tiles 412, 414, the bus stop associated with instruction bus 424 will examine the header bitmap to determine the instruction type/subtype. The instruction may be received by the tile and subsequently written to an instruction buffer of the tile prior to execution of the instruction by the tile. The instruction buffer of the tile in which the instruction is written may be determined by the type and subtype indicator/field of the instruction. The instruction buffers may include a first-in first-out (FIFO) control scheme that prioritizes consumption of one or more related instructions. Thus, under this FIFO control scheme, instructions of the same type/subtype will always be executed in the order in which the instruction arrived on the instruction bus.

The different instruction buffers within a tile are the TensorOp instruction buffers and the DMAOp instruction buffers. As indicated above, instruction types include the TensorOp instruction and the DMAOp instruction. With regard to DMAOp instructions, instruction subtypes (indicating a 'write-to' buffer location) include the following: 1) mesh inbound instruction buffer; 2) mesh outbound instruction buffer; 3) narrow-wide DMA instruction buffer; 4) wide-narrow DMA instruction buffer; and 5) ring bus DMA instruction buffer. These buffer locations will be described in more detail below with reference to FIG. 5. Wide and narrow designations are used throughout the specification and generally refer to an approximate size in width (bits/bytes) of one or more memory units. As used herein, "narrow" may refer to one or more memory units each having a size or width of less than 16-bits and "wide" may refer to one or more memory units each having a size or width or less than 64-bits.

Mesh bus 426 provides a data communications path that is distinct from CSR bus 422, instruction bus 424, and ring bus 428 (described below). As depicted in FIG. 4, mesh bus 426 provides a communications path that couples or connects each tile to its corresponding neighbor tile in both the X and Y dimensions. In various implementations, mesh bus 426 may be used to transport input activation quantities between one or more narrow memory units in adjacent tiles. As shown, mesh bus 426 does not allow direct forwarding of input activation data to non-adjacent tiles.

In various implementations, mesh bus 426 and the various tiles connected via mesh bus 426 may have the following configuration. Four corner tiles of the mesh have two outbound ports and two inbound ports. Four edge tiles of the mesh have three inbound ports and three outbound ports. All non-edge, non-corner tiles have four inbound ports and four outbound ports. In general, given an example N×N tile layout, edge tiles are tiles with only three neighbor tiles while corner tiles are tiles with two neighbor tiles. Regarding data flow methodology via mesh bus 426, in general, every input activation that arrives via mesh bus 426 for a particular tile must be committed to one or more narrow memory units of the tile. Moreover, for tile configurations that have fewer than four inbound ports, DMAOp instructions may write zero values to the locations in the tile's narrow memory instead of waiting for data on an absent input port. Likewise, for tile configurations that have fewer than four outbound ports, DMAOp instructions will not execute the narrow memory reads and port writes related to transfers for any absent ports.

In some implementations, a location or address of a narrow memory unit(s) that a particular input activation will be written to, or read from, will be generated by a Tensor Traversal Unit (hereinafter "TTU") based on inbound/outbound DMAOp provided via mesh bus 426. An inbound DMAOp and an outbound DMAOp may be executed concurrently and any required synchronization will be managed through sync flag control schemes administered by controller 402. TTUs are described in further detail below with reference to FIG. 5.

Ring bus 428 originates from controller 402 and, similar to CSR bus 422 and instruction bus 424, also provides communications coupling through a bus data path that connects tiles 412, 414 in a ring back to controller 402. In various implementations, ring bus 428 generally connects or couples all wide memory units (described in more detail below with reference to FIG. 5) in all tiles 412, 414. Thus, a payload width of ring bus 428 corresponds to the width of the wide memory units disposed within each tile of tile sets 412, 414. As discussed above, ring bus 428 also includes a bitmap header indicating the tiles that need to consume payload data comprising instructions or parameters communicated via ring bus 428.

With regard to data (i.e., payload) received at a particular tile via ring bus 428, in response to receiving the information, each tile will zero (i.e., clear out) position data indicated in the bitmap header that is unique to the receiving tile before forwarding the data on to another tile. Hence, when the header bitmap has no remaining bit set data indicating a particular tile that is to receive the payload, forwarding of the payload to another tile will stop. Payload data generally refers to activations and weights used by one or more tiles during tensor computations performed based on execution of deeply nested loops.

In some implementations, controller 402 may be described as being a part of ring bus 428. In one example, for DMAOp instructions executed within a particular tile, controller 402 may be used to pop the data/payload from ring bus stops and forward the payload to a ring bus stop in a next tile in the ring. Controller 402 may also cause the payload data to be committed to one or more wide memory units of the tile if such action is required by instructions in the bitmap header. The address of the one or more wide memory units to which the data needs to be written may be generated by DMAOp instructions within the particular tile.

In various implementations, each tile of tile set 412, 414 can either be a producer of payload data or a consumer of payload data. When a tile is a producer of payload data the tile reads the data from one or more of its wide memory units and multicasts the data over ring bus 428 for consumption by one or more other tiles. When a tile is a consumer of payload data the tile receives and writes the data to one or more wide memory units within the tile and forwards the payload data for consumption by one or more other tiles. With regard to movement of payload data via ring bus 428, there typically will only be one producer/master of data on ring bus 428 at any given time. The DMAOp instruction execution order (e.g., FIFO control scheme) in all tiles will ensure there is only one producer/master of data on ring bus 428 at a given time.

In some implementations, controller 402 uses a sync flag control architecture to ensure there is only one producer/master of payload data on ring bus 428 at a given time. In one example, every write by a tile to a ring output will trigger an increment of the corresponding sync flag count. Controller 402 may examine the payload data to determine the number of data chunks or segments that comprise the payload. Controller 402 then monitors execution by the tile to ensure the expected number of data segments are forwarded and/or consumed by the tile before another tile executes in master mode.

An exception to ensuring there is only one producer/master of data on ring bus 428 at a given time occurs when there are local multicast groups connected via ring bus 428 that do not have an overlapping region on the ring bus. For example, tile 0 (master) may multicast (i.e., produce data) to a tile in Tile 0-Tile 3 grouping, while Tile 4 (master) may do the same to a tile in Tile 4-Tile 7 grouping. An important requirement of this dual master multicast methodology is that different multicast groups must not be allowed to see each other's data packets because packet overlap may occur and lead to one or more data computation errors.

As shown in FIG. 4, controller 402 provides a communications data path that couples or connects tiles in tile sets 412, 414 to I/O 410 and includes several core functions. The core functions of controller 402 generally include feeding one or more I/O input activations to tiles in tile sets 412, 414 feeding one or more input activations and parameters received from I/O 410 to the tiles, feeding one or more instructions received from I/O 410 to the tiles, sending I/O output activations to host interface 408, and serving as a ring stop for CSR bus 422 as well as ring bus 428. As described in more detail below, first tile set 412 and second tile set 414 each include multiple tiles that are used to perform one or more tensor computations that are executed based on a deep loop nest comprised of inner and outer loops.

System 400 generally operates as follows. Host interface 408 will provide one or more instructions to controller 402 that define direct memory access operations (DMAOp) that occur for a given computation. Descriptors associated with instructions fed to controller 402 will include information required by the controller to facilitate large scale dot product computations associated with multi-dimensional data arrays (tensors). In general, controller 402 receives, from host interface 408, input activations, tile instructions, and model parameters (i.e., weights) for executing tensor computations for a given layer of a neural network. Controller 402 may then cause the instructions to be multicast to tiles 412, 414 in a data flow manner defined by the instruction(s). As discussed above, tiles consuming an instruction may then initiate a broadcast of a new/subsequent instruction to another tile based on bitmap data in the instruction header.

With regard to data flow, input activations and parameters are transmitted to tiles of tile sets 412, 414 via ring bus 428. Each of tiles 412, 414 will store a subset of the input activations needed to compute a subset of output activations that are assigned to that particular tile. DMAOp instructions for a tile will cause the input activation to be moved from wide memory to narrow memory. Computation within a tile begins when required input activations, parameters/weights and computation instructions (TTU operations, memory addresses, etc.) are available in the tile. Computations occurring within a tile ends when MAC operators (described below) within a tile complete all dot product operations defined by the instruction set and pre-activation functions are applied to the results (i.e., output activations) of the multiplication operations.

Results of the one or more tensor computations include writing output activations of a compute layer to a narrow memory unit(s) of the tile performing the computation. For certain tensor computations, there will be a transfer of output edge activations to neighboring tiles via mesh bus 426. Transfer of output edge activations to neighboring tiles are required to compute output activations for a subsequent layer when computations span multiple layers. When computations for all layers are complete, a DMAOp will move final activations to classifier tile 416 through ring bus 428. Controller 402 will then read final activations from classifier tile 416 and execute a DMAOp to move the final activations to host interface 408. In some implementations, classifier portion 416 performs computations of an output layer (i.e., the last layer) of the NN. In other implementations, the output layer of the NN is one of a classifier layer, a regression layer, or another layer type that is generally associated with neural networks.

Figure 5:
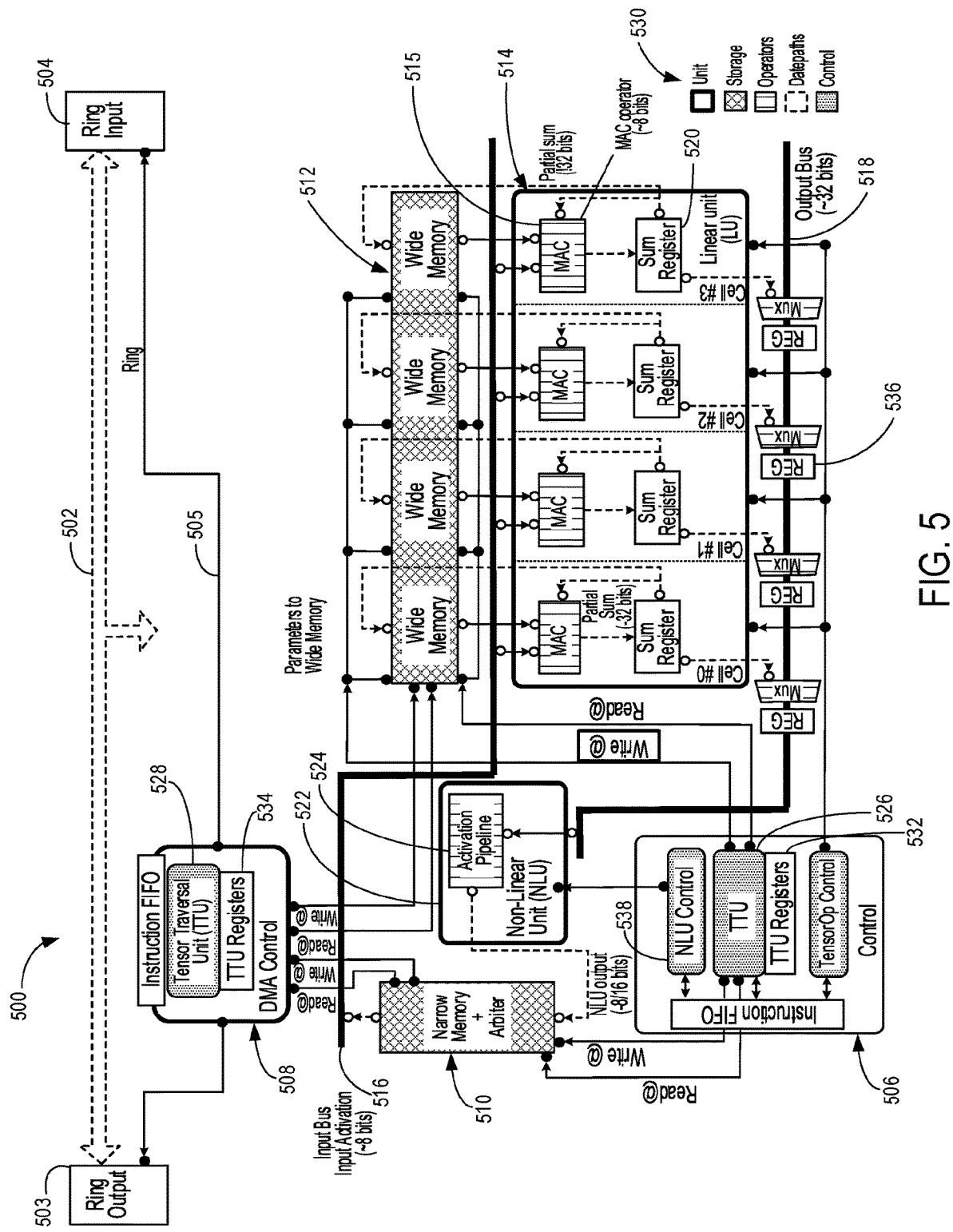
FIG. 5 illustrates an example neural network (NN) compute tile.

FIG. 5 illustrates an example neural network (NN) compute tile 500 which could be used in an ASIC 106 as described with reference to FIG. 1. Generally, the example tile 500 may correspond to any of the tiles within first tile set 412 and second tile set 414 discussed above with reference to FIG. 4. In various implementations, compute tile 500 may also be referenced or referred to as computing unit 500. Each compute tile 500 is a self-contained computational unit configured to execute instructions independently relative to other corresponding tiles within tile sets 412, 414. As discussed briefly above, each compute tile 500 executes two types of instructions, a TensorOp instruction and a DMAOp instruction. In general, each instruction type will include compute operations associated with deep loop nests and thus each instruction type will generally execute over multiple time epochs to ensure completion of all loop iterations.

As discussed in more detail below, the different instruction types are executed by independent control units within compute tile 500 that synchronize on data through sync flag controls that are managed within compute tile 500. The sync flag controls manage concurrency between executions of different instruction types within compute tile 500. Each compute operation associated with each instruction type will be executed in strict order of issuance (i.e., First-In First-Out). With regard to the two instruction types, TensorOP and DMAOp, there are no ordering guarantees between these different instruction types and each type is treated by compute tile 500 as a separate thread of control.

With regard to data flow constructs, compute tile 500 generally includes data path 502 and data path 505 that each provide a communications path for data flow into and out of compute tile 500. As described above, system 400 includes three distinct data bus structures that are laid out in a ring configuration—CSR bus 422, instruction bus 424, and ring bus 428. Referring to FIG. 5, data path 505 corresponds to instruction bus 424, while data path 502 generally corresponds to one of CSR bus 422 and ring bus 428. As shown, data path 502 includes a ring output 503 providing an output path for data leaving compute tile 500 and a ring input 504 providing an input path for data entering compute tile 500.

Compute tile 500 further includes a TensorOp control 506 including a TensorOp tensor traversal unit (TTU) 526 and a DMAOp control 508 including a DMAOp TTU 528. TensorOp control 506 generally manages writes to and reads from TensorOp TTU register 532 and administers traversal operations for execution by TensorOp TTU 526. Likewise, DMAOp control 508 generally manages writes to and reads from DMAOp TTU register 534 and administers traversal operations for execution by DMAOp TTU 528. TTU register 532 includes instruction buffers for storing one or more instructions comprising operations to be performed by TensorOp TTU 526 upon execution of the instructions by TensorOp control 506. Likewise, TTU register 534 includes instruction buffers for storing one or more instructions comprising operations to be performed by TTU 508 upon execution of the instructions by DMAOp control 508. As described further below, TTUs are used by compute tile 500 to traverse array elements of one or more tensors that generally reside in narrow memory 510 and wide memory 512.

In some implementations, certain instructions for execution by compute tile 500 arrive at the tile via data path 505 (i.e., a portion of instruction bus 424). Compute tile 500 will examine the header bitmap to determine the instruction type (TensorOp or DMAOp) and the instruction subtype (read operation or write operation). Instruction(s) received by compute tile 500 are subsequently written to a particular instruction buffer depending on the instruction type. In general, instructions are received and stored (i.e., written to the buffer) prior to execution of the instruction by a component of compute tile 500. As shown in FIG. 5, the instruction buffers (i.e., TensorOp TTU register 532 and DMAOp TTU register 534) may each include a first-in first-out (FIFO) control scheme that prioritizes consumption (execution) of one or more related instructions.

As discussed briefly above, a tensor is a multi-dimensional geometric object and example multi-dimensional geometric objects include matrices and data arrays. An algorithm, including deeply nested loops, may be executed by compute tile 500 to perform tensor computations by iterating one or more nested loops to traverse an N-dimensional tensor. In one example computational process, each loop of the loop nest may be responsible for traversing a particular dimension of the N-dimensional tensor. As described herein, TensorOp control 506 generally administers one or more tensor operations that drive the sequence in which dimensional elements of a particular tensor construct are traversed and accessed to complete computations defined by the deep nested loops.

Compute tile 500 further includes a narrow memory 510 and a wide memory 512. Narrow and wide designations generally refer to a size in width (bits/bytes) of the memory units of narrow memory 510 and wide memory 512. In some implementations, narrow memory 510 includes memory units each having a size or width of less than 16-bits and wide memory 512 includes memory units each having a size or width or less than 32-bits. Generally, compute tile 500 receives input activations via data path 505 and DMA control 508 executes an operation to write the input activations into narrow memory 510. Likewise, compute tile 500 receives parameters (weights) via data path 502 and DMA control 508 executes an operation to write the parameters into wide memory 512. In some implementations, narrow memory 510 can include a memory arbiter typically used in shared memory systems to decide, for each memory cycle, which control device (e.g., TensorOp control 506 or DMAOp control 508) will be allowed to access that shared memory units of narrow memory 510.

Compute tile 500 further includes an input activation bus 516 and a MAC array 514 including multiple cells that each include a MAC operator 515 and a sum register 520. In general, MAC array 514 executes, using MAC operators 515 and sum registers 520 across multiple cells, tensor computations that include arithmetic operations relating to dot product computations. Input activation bus 516 provides a data path in which input activations are provided, by narrow memory 510, one-by-one for respective access by each MAC operator 515 of MAC array 514. Hence, based on the one-by-one broadcast of an input activation, a single MAC operator 515 of a particular cell will each receive an input activation. Arithmetic operations performed by the MAC operators of the MAC array 514 generally include multiplying an input activation provided by narrow memory 510 with a parameter accessed from wide memory 512 to produce a single output activation value.

During arithmetic operations, partial sums may be accumulated and stored in a corresponding, e.g., sum register 520, or written to wide memory 512 and re-accessed by a particular cell of MAC array 514 to complete follow-on multiply operations. The tensor computations can be described as having a first portion and second portion. The first portion is complete when multiply operations produce an output activation, for example, by completing a multiplication of an input activation and a parameter to generate the output activation. The second portion includes application of a non-linear function to an output activation and the second portion is complete when the output activation is written to narrow memory 510 after application of the function.

Compute tile 500 further includes an output activation bus 518, a non-linear unit (NLU) 522 comprising an output activation pipeline 524, an NLU control 538, and a reference map 530 that indicates a core attribute of a component in compute tile 500. Reference map 530 is shown for clarity, but is not included in the compute tile 500. Core attributes include whether a particular component is a unit, a storage device, an operator, a control device or a data path. In general, upon completion of the first portion of the tensor computations, output activations are provided from MAC array 514 to NLU 522 via output activation bus 518. After arrival at NLU 522, data specifying an activation function, received via activation pipeline 524 is applied to the output activations and the output activations are then written to narrow memory 510. In some implementations, output activation bus 518 includes at least one pipelined shift register 536 and completing the second portion of the tensor computations includes using a shift register 536 of activation bus 518 to shift output activations toward narrow memory 510.

With regard to dot product computations of, for example, two multi-dimensional data arrays, for a single compute tile 500, MAC array 514 provides robust single instruction multiple data (SIMD) functionality. SIMD generally means that all parallel units (multiple MAC operators 515) share the same instruction (based on the deep loop nest), but each MAC operator 515 executes the instruction on different data elements. In one basic example, adding the arrays [1,2,3,4] and [5,6,7,8] element-wise to obtain the array [6,8,10,12] in one cycle will typically require four arithmetic units to execute the operation on each element. By using SIMD, the four units can share the same instruction (e.g., "add") and perform computations in parallel. Thus, system 400 and compute tile 500 provides enhanced acceleration and parallelism in tensor computations over prior methods.

In one example, and as described in more detail below, a single instruction can be provided by controller 402 to multiple compute tiles 500 (see tile sets 412, 414 of FIG. 4) for consumption by multiple MAC arrays 514. In general, neural network layers can include multiple output neurons and the output neurons can be partitioned such that tensor computations associated with a subset of output neurons can be assigned to a particular tile of tile sets 412, 414. Each tile of tile sets 412, 414 can then perform related tensor computations on different groups of neurons for a given layer. Compute tile 500 can therefore provide at least two forms of parallelism: 1) one form includes partitioning the output activations (corresponding to the subset of output neurons) amongst the multiple tiles of tile set 412, 414; and 2) another form includes simultaneous computation (with a single instruction) of multiple subsets of output neurons based on the partitioning amongst the tiles of tile sets 412, 414.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, although bus lines are described as "controllable," not all bus lines need to have the same level of control. For instance, there can be varying degrees of controllability, where some bus lines can be controlled only where some bus lines are restricted in terms of the number of tiles from which they can source data or to which they can send data. In another example, some bus lines may be dedicated to providing data along a single direction, such as north, east, west, or south as described herein. In some cases, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A method of operating a machine learning accelerator, comprising:
   executing, by a scalar core directing a plurality of compute units of the machine learning accelerator, a first process in a first context, wherein the first process is a long-running process;
   identifying, by a job scheduler of the machine learning accelerator, that a second process is queued, wherein the second process has a higher priority than a priority of the long-running process, and upon reaching a preemption checkpoint:
      determining, by the scalar core, an amount of available resources and in response to the amount of available resources being less than a required amount for the second process:
         saving, by the scalar core, in-process values of the first process;
         switching, by the scalar core, to a second context;
         executing, by the scalar core, the second process;
         upon completion of the second process, switching, by the scalar core, to the first context;
         restoring, by the scalar core, the in-process values of the first process; and
         resuming, by the scalar core, execution of the first process.

2. The method of claim 1, wherein the in-process values comprise instructions, activation data, parameters, hardware states, compute operands, and compute results.

3. The method of claim 1, comprising in response to the amount of available resources being greater than the required amount for the higher priority process:
   pausing, by the scalar core, execution of the first process;
   allocating available resources to the second process;
   switching, by the scalar core, to a second context;
   executing the second process;
   switching, by the scalar core, to the first context; and
   resuming execution of the first process.

4. The method of claim 3, wherein allocating available resources to the higher priority process comprises assigning a start and stop address for each memory in a plurality of memories of the plurality of compute units.

5. The method of claim 1, wherein:
   at compile-time for the first process:
      determining a maximum allowable latency for the second process;
      identifying data synchronization checkpoints to be used as preemption points;
      determining a maximum expected time delay between data synchronization checkpoints; and
      in response to determining the maximum time delay between data synchronization checkpoints is above a predetermined threshold:
         inserting preemption checkpoints in code for the first process.

6. The method of claim 5, wherein the synchronization checkpoint and the preemption checkpoint are memory fences.

7. The method of claim 1, wherein performing a save for the first process comprises:
   copying, by the scalar core, data from each memory of a plurality of memories of the plurality of compute units to a shared memory; and
   clearing, by the scalar core, each memory of the plurality of memories of the plurality of compute units.

8. The method of claim 7, wherein performing a restore of the first process comprises:
   writing, by the scalar core, the data from the shared memory to each memory of the plurality of memories of the plurality of compute units.

9. A system for preempting operations in a machine learning accelerator, comprising:
   a scalar core comprising one or more processors and configured to direct a plurality of compute units of the machine learning accelerator;
   a job scheduler;
   one or more tangible, non-transitory media operably connectable to the one or more processors and storing instructions that, when executed, cause the one or more processors to perform operations comprising:
      executing, by the scalar core, a first process in a first context, wherein the first process is a long-running process;
      identifying, by the job scheduler, that a second process is queued, wherein the second process has a higher priority than a priority of the long-running process, and upon reaching a preemption checkpoint:
         determining, by the scalar core, an amount of available resources and in response to the amount of available resources being less than a required amount for the second process:
            saving, by the scalar core, in-process values of the first process;
            switching, by the scalar core, to a second context;
            executing, by the scalar core, the second process;
            upon completion of the second process, switching, by the scalar core, to the first context;
            restoring, by the scalar core, the in-process values of the first process; and
            resuming, by the scalar core, execution of the first process.

10. The system of claim 9, wherein the in-process values comprise instructions, activation data, parameters, hardware states, compute operands, and compute results.

11. The system of claim 9, comprising in response to the amount of available resources being greater than the required amount for the higher priority process:
    pausing, by the scalar core, execution of the first process;
    allocating available resources to the second process;
    switching, by the scalar core, to a second context;
    executing the second process;
    switching, by the scalar core, to the first context; and
    resuming execution of the first process.

12. The system of claim 11, wherein allocating available resources to the higher priority process comprises assigning a start and stop address for each memory in a plurality of memories of the plurality of compute units.

13. The system of claim 9, wherein:
    at compile-time for the first process:
       determining a maximum allowable latency for the second process;
       identifying data synchronization checkpoints to be used as preemption points;
       determining a maximum expected time delay between data synchronization checkpoints; and
       in response to determining the maximum time delay between data synchronization checkpoints is above a predetermined threshold:
          inserting preemption checkpoints in code for the first process.

14. The system of claim 13, wherein the synchronization checkpoint and the preemption checkpoint are memory fences.

15. The system of claim 9, wherein performing a save for the first process comprises:
copying, by the scalar core, data from each memory of a plurality of memories of the plurality of compute units to a shared memory; and
clearing, by the scalar core, each memory of the plurality of memories of the plurality of compute units.

16. The system of claim 15, wherein performing a restore of the first process comprises:
writing, by the scalar core, the data from the shared memory to each memory of the plurality of memories of the plurality of compute units.

17. A non-transitory computer readable storage medium storing instructions that, when executed by at least one processor, cause at least one processor of a machine learning accelerator to perform operations comprising:
executing, by a scalar core directing a plurality of compute units of the machine learning accelerator, a first process in a first context, wherein the first process is a long-running process;
identifying, by a job scheduler, that a second process is queued, wherein the second process has a higher priority than a priority of the long-running process, and upon reaching a preemption checkpoint:
determining, by the scalar core, an amount of available resources and in response to the amount of available resources being less than a required amount for the second process:
saving, by the scalar core, in-process values of the first process;
switching, by the scalar core, to a second context;
executing, by the scalar core, the second process;
upon completion of the second process, switching, by the scalar core, to the first context;
restoring, by the scalar core, the in-process values of the first process; and
resuming, by the scalar core, execution of the first process.

18. The medium of claim 17, wherein the in-process values comprise, instructions, activation data, parameters, hardware states, compute operands, and compute results.

19. The medium of claim 17, comprising in response to the amount of available resources being greater than the required amount for the higher priority process:
pausing, by the scalar core, execution of the first process;
allocating available resources to the second process;
switching, by the scalar core, to a second context;
executing the second process;
switching, by the scalar core, to the first context; and
resuming execution of the first process.

20. The medium of claim 17, wherein:
at compile-time for the first process:
determining a maximum allowable latency for the second process;
identifying data synchronization checkpoints to be used as preemption points;
determining a maximum expected time delay between data synchronization checkpoints; and
in response to determining the maximum time delay between data synchronization checkpoints is above a predetermined threshold:
inserting preemption checkpoints in code for the first process.

* * * * *

UNITED STATES PATENT AND TRADEMARK OFFICE
CERTIFICATE OF CORRECTION

PATENT NO. : 12,197,959 B2
APPLICATION NO. : 18/036506
DATED : January 14, 2025
INVENTOR(S) : Fadelu et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 56 days.

Signed and Sealed this
Third Day of June, 2025

Coke Morgan Stewart
*Acting Director of the United States Patent and Trademark Office*